United States Patent [19]

Wallace et al.

[11] 3,951,328

[45] Apr. 20, 1976

[54] JOINING OF METAL SURFACES

[75] Inventors: Eric Robert Wallace, Cambridge, England; Ernest William Dewing, Arvida, Canada

[73] Assignee: Alcan Research and Development Limited, Montreal, Canada

[22] Filed: Oct. 6, 1975

[21] Appl. No.: 620,112

Related U.S. Application Data

[63] Continuation of Ser. No. 447,168, March 1, 1974, abandoned, which is a continuation-in-part of Ser. No. 384,272, July 31, 1973, abandoned.

[52] U.S. Cl. .............................. 228/207; 148/23; 148/26; 228/223
[51] Int. Cl.² .................. B23K 31/02; B23K 35/36
[58] Field of Search .................. 228/207, 223, 224; 148/23, 26

[56] References Cited
UNITED STATES PATENTS

| | | | |
|---|---|---|---|
| 3,192,076 | 6/1965 | Balass et al. ........................ | 148/26 |
| 3,580,748 | 5/1971 | DeLong .............................. | 148/26 |
| 3,620,716 | 11/1971 | Hess .................................. | 75/68 |

FOREIGN PATENTS OR APPLICATIONS

| | | | |
|---|---|---|---|
| 1,055,914 | 1/1967 | United Kingdom ................. | 228/223 |

OTHER PUBLICATIONS

*Brazing Manual*, American Welding Society, Inc., 1963, pp. 33 and 54.

*Primary Examiner*—Carl E. Hall
*Attorney, Agent, or Firm*—Cooper, Dunham, Clark, Griffin & Moran

[57] ABSTRACT

In methods of joining metal surfaces involving heating to a temperature above about 560°C, the use of a flux comprising a mixture of potassium fluoaluminates. Particularly for brazing aluminum, a flux consisting essentially of potassium fluoaluminate complexes (e.g. $KAlF_4$ and $K_3AlF_6$) may be employed, having a composition corresponding to an $AlF_3/KF$ ratio, in parts by weight, between about 65:35 and about 45:55. The flux is essentially free of unreacted potassium fluoride and may be in divided solid form.

16 Claims, No Drawings

JOINING OF METAL SURFACES

CROSS-REFERENCE TO RELATED APPLICATION

This is a continuation of application Ser. No. 447,168 filed Mar. 1, 1974, now abandoned, as a continuation-in-part of application Ser. No. 384,272 filed July 31, 1973, now abandoned, by Ian Thomas Taylor, Joseph Hron, Robert Arthur Innes, Eric Robert Wallace, and Ernest William Dewing.

BACKGROUND OF THE INVENTION

This invention relates to methods of joining metal surfaces as by brazing, welding or the like. More particularly, the invention relates to improvements in fluxing, i.e. the provision of flux, in metal-joining operations, and to flux compositions having utility therein, as well as to methods of making such fluxes.

Stated broadly, the present invention is applicable to metal-joining techniques wherein metal surfaces are joined with metal heated to molten state at temperatures above about 560°C, and wherein a flux is employed for such purposes as cleaning the surfaces to be joined and/or promoting flow of molten filler or joining metal. The welding and brazing of a variety of metals are thus appropriate for the practice of the invention in this broad sense.

In one important specific aspect, the invention is particularly directed to improvements in the brazing of aluminum and alloys thereof, as affording especially significant advantages in overcoming certain problems heretofore associated with such brazing. Detailed reference will be made herein to aluminum brazing operations, for purposes of illustration, and as exemplary of the types of operations with which the invention may be used.

The brazing of aluminum involves joining surfaces of aluminum or aluminum alloy components with a so-called aluminum brazing alloy, i.e. an alloy of aluminum typically having a melting point substantially lower than that of the components. In such operations, the component surfaces are joined by juxtaposing them with the brazing alloy adjacent to or between them, and heating to a temperature that will effect melting of the brazing alloy without melting the components. For assured attainment of this heating condition, it is commonly preferred in present-day industrial practice that the melting point of the brazing alloy be at least about 30° to about 40°C lower than that of the components. A currently preferred brazing alloy is an aluminum-silicon eutectic melting at about 577°C. It will be understood that reference herein to "surfaces to be joined" in aluminum brazing operations means the surfaces of metal (i.e. aluminum or alloys thereof, at the locality of the joint) other than the brazing alloy, which is of course also joined to these other metal surfaces by the brazing operation.

A brazing alloy may be placed adjacent to or interposed between the surfaces to be joined as a discrete sheet or body or in particulate form, or a layer of the brazing alloy may be pre-clad on at least one of the surfaces. For convenience, the term "brazing sheet" will be employed herein to designate articles having a core of aluminum or aluminum alloy with a cladding (on one or more surfaces) of a brazing alloy of lower melting point, including sheet, tube and other forms suitable for brazing; and it will further be understood that the term "surfaces to be joined" as applied to brazing sheet designates the surface of core metal underlying the cladding. Such brazing sheet (typically having a core-cladding melting point differential of about 30°–40°C, as stated) is extensively used e.g. in the production of heat exchangers.

In aluminum brazing operations, it is ordinarily necessary to employ a flux to remove aluminum oxide coatings present on exposed metal surfaces (including brazing alloy surfaces) at the locality of formation of the brazed joint, and also desirably to promote flow of the brazing alloy. The flux is thus disposed for contact with all such exposed surfaces; for instance, when brazing sheet is used, the flux is placed between or in proximity to the clad surface of the brazing sheet and the other aluminum surface to which the sheet is to be joined, i.e. prior to application of brazing heat. Stated in general, the flux must have the properties of acting as a flux to dissolve and/or otherwise remove metal (e.g. aluminum) oxides, becoming reactive (i.e. capable of removing the oxide) at the brazing temperatures, and being essentially inert with respect to aluminum at such temperatures. It is also believed that the flux serves to inhibit formation of further oxide. Since fluxes are usually reactive only when at least partially molten, it is generally required that the flux be partly or wholly molten at the brazing temperature, e.g. (in the specific instance of use of the aforementioned preferred brazing alloy) at temperatures not substantially higher, and indeed preferably lower, than 577°C.

The most common commercial flux heretofore conventionally employed for brazing aluminum has been a mixture of predominantly chloride salts, including alkali metal and alkaline earth metal chlorides with minor inclusions of fluorides as well in some cases. These water soluble materials are corrosive to aluminum in the presence of moisture. Consequently at the end of the brazing operation the brazed assembly must be subjected to a cleaning operation (as by washing with water) to remove the water soluble flux. Even so, there are usually inclusions of the flux in the joint which may result in corrosion after a relatively short interval, particularly where the brazed assembly may be subjected to humid conditions. Moreover, it may be difficult or impossible to achieve fully effective cleaning, especially in the case of assemblies of complex configuration.

Various alternative expedients have heretofore been proposed to avoid the difficulties resulting from presence of a water-soluble flux residue at the locality of the joint after brazing. For instance, it is already known to braze aluminum without the use of a flux under vacuum or inert gas conditions, but the capital cost of the equipment employed is very high. Moreover, a major disadvantage of the fluxless brazing methods is that much closer tolerances must be observed for assembly than for flux brazing. Any failure to maintain very close tolerances results in the brazed assemblies being rejected due to incompletely filled joints.

It has also heretofore been proposed, in British Pat. No. 1,055,914, to produce a flux for joining aluminum by mixing 53–55% $AlF_3$ with 47 to 45% $KF$ (percentages by weight), within which range a known eutectic point occurs, having a melting point of about 560°C. In this prior proposal the materials are either mixed dry, with subsequent addition of water, or the $KF$ is added in aqueous solution. In both alternatives the resultant paste is dried at a temperature below 200°C, and thereafter applied (i.e. without other heating) to the surfaces to be fluxed.

The material produced by that method was reported as leaving a brittle, nonhygroscopic residue at the end of the joining operation. However, prior to the joining operation, the soluble potassium fluoride and insoluble aluminum fluoride in the flux mixture are at least very largely free or unreacted; the flux mixture is thus hygroscopic, and is unsuitable for use in aqueous slurry. Slurrying of this material in water would result in solution of KF and consequent possibility of disproportionation of the flux on drying and melting point variability. For example, if this fluoride mixture were applied in aqueous slurry to a metal surface, run-off of water would cause preferential removal of the dissolved potassium fluoride and thereby upset the desired relative proportions of the two fluorides. Indeed, the aforementioned fluoride mixture usually cannot be satisfactorily stored for any length of time without special protection from the atmosphere, even if initially more or less dry, owing to the effect of atmospheric moisture on this highly hygroscopic material.

Even if (as proposed in the patent) the fluoride mixture is used in an inert and nonhygroscopic vehicle, it may nevertheless be vulnerable to deterioration in the presence of atmospheric moisture, again because of its hygroscopic nature, since many such vehicles (e.g. resins) are more or less permeable to moisture. Moreover, in some brazing operations use of a resinous vehicle may be inconvenient or undesirable. For instance, in production of certain closed heat exchanger assemblies (e.g. radiators for motor vehicles and evaporators for air conditioners) by brazing, particular operating conditions may create a carbonaceous residue of a resin vehicle during brazing; i.e. the available oxygen in such closed assemblies may in particular cases be insufficient, in relation to the amount of resin present, to enable adequate burning off of the resin incident to the brazing operation. In these and other circumstances, then, it is sometimes preferable that the flux be entrained in a vehicle which is substantially completely evaporable. Of such vehicles water is generally the most suitable, both from aspects of cost and operating convenience, since it leaves no residue and requires no oxygen for burn-off.

In other words, then, it would be desirable for many aluminum brazing operations to employ a flux which not only meets the general requirements for aluminum-brazing fluxes, and leaves no substantially water-soluble or corrosive residue after brazing, but which also is nonhygroscopic and substantially water-insoluble prior to brazing. Among the advantages of the last-mentioned property would be capability of storage of the flux, ease and convenience in handling and applying the flux, avoidance of disproportionation of the flux constituents, and ability of the flux to be used in an aqueous slurry.

While the foregoing discussion has been directed specifically to aluminum brazing operations, similar considerations are more or less relevant to other metal-surface-joining operations as well.

SUMMARY OF THE INVENTION

An object of the present invention is to provide new and improved methods of joining metal surfaces, wherein a flux is employed that leaves no substantially water-soluble residue after use, and is essentially nonhygroscopic prior to use. Other objects are to provide flux compositions suitable for use in such methods, and to provide methods of making such fluxes.

A further object of the invention is to provide improvements in fluxing in aluminum brazing operations, characterized by the use of a flux material which is nonhygroscopic prior to brazing and substantially water-insoluble both before and after brazing; which is essentially inert with respect to metallic aluminum at brazing temperatures; which acts to remove oxides including aluminum oxide; and which becomes reactive at brazing temperatures, e.g. temperatures not higher than about 600°C.

To these and other ends, the present invention broadly contemplates, in metal-surface-joining methods, the provision of a flux comprising an intimate mixture of potassium fluoaluminate complexes and essentially free of unreacted potassium fluoride. That is to say, in accordance with the invention, a flux having the stated composition is applied to one or more of plural metal surfaces to be joined, prior to heating to produce the desired joint. It is found that such fluxes are nonhygroscopic and leave no substantially water-soluble residue, and that at temperatures ranging upwardly from about 560°C they are reactive (i.e. effective to strip oxides from metal surfaces) while being essentially inert with respect to the metal of the surfaces and performing other usual flux functions, e.g. promoting flow of brazing alloy and preventing subsequent oxide formation. Thus such fluxes are broadly suitable for metal-joining operations wherein the joining temperatures employed are upwards of about 560°C.

As herein used, "potassium fluoaluminate complexes" refers to complexes of the type formed by fusion of $AlF_3$ and KF, such complexes having the formulas $K_3AlF_6$ and $KAlF_4$. One method of preparing a flux in accordance with the present invention comprises mixing $AlF_3$ and KF in appropriate proportions and fusing the mixture to constitute the same as an intimate mixture of the complexes. Thus, X-ray diffraction examination of the solidified residue of the fused eutectic mixture of KF and $AlF_3$, which occurs at about 45.8% KF and 54.2% $AlF_3$, indicates that virtually all the fluoride contents are in the form of $K_3AlF_6$ and $KAlF_4$, which are very sparingly soluble in water and are nonhygroscopic. In fact, the fused eutectic consists of these two phases and not of KF and $AlF_3$.

It is to be understood that all percentages herein are expressed as percentages by weight, unless otherwise stated.

The liquidus point of a mixture of potassium fluoaluminate complexes varies depending upon the composition of the mixture, expressed as relative proportions of $AlF_3$ and KF, reaching a minimum (about 560°C) at the aforementioned eutectic composition. For many purposes, it is especially preferred in the practice of the invention to employ a flux at or close to this eutectic composition; however, in a broader sense, the invention embraces the use as fluxes of intimate mixtures of potassium fluoaluminate complexes having a composition corresponding to an $AlF_3$/KF ratio, in parts by weight, between about 65:35 and about 45:55 (preferably between about 60:40 and about 50:50) and, as stated, essentially free of unreacted potassium fluoride.

At compositions corresponding to an $AlF_3$ content below about 60%, the mixture of potassium fluoaluminate complexes, in dry state, consists essentially of $K_3AlF_6$ and $KAlF_4$. At higher levels of $AlF_3$ content within the stated range, the mixtures are constituted of $KAlF_4$ with some unreacted $AlF_3$ (which is insoluble in water) but, again, essentially free of unreacted KF; such mixtures ($KAlF_4$ with $AlF_3$) are embraced within the term "mixtures of potassium fluoaluminate complexes" as used herein. Between that part of the flux composition range in which the flux is a mixture of $KAlF_4$ with $K_3AlF_6$, and that part of the range in which the flux is a mixture of $KAlF_4$ with $AlF_3$, there is a unique point (i.e. a unique value of the $AlF_3$/KF ratio, slightly below that corresponding to 60% $AlF_3$) at which the composition consists of $KAlF_4$ alone. Thus the stated composition range inherently includes this point at which the "mixture of complexes" is solely $KAlF_4$; in other words, pure $KAlF_4$ lies at a unique intermediate point within the stated range. Accordingly, the term "mixtures of potassium fluoaluminate complexes" as used herein further inherently embraces a composition consisting essentially of $KAlF_4$. Minor amounts of other fluorides (e.g. LiF, NaF, or $CaF_2$) may be incorporated in the flux.

An important feature of the fluxes embraced by the present invention is that they are essentially free of unreacted potassium fluoride; in this way, the advantageous properties of a fluoride flux (e.g. an $AlF_3$-KF mixture) are realized without the problems (such as hygroscopicity and unsuitability for use in aqueous slurry) associated with unreacted potassium fluoride. In this connection it may be explained, with reference to the subject mixtures of potassium fluoaluminate complexes, that in the presence of water there is theoretically some dissolution of $K_3AlF_6$ and resultant appearance of minor amounts of unreacted KF, viz.:

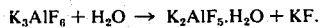

$$K_3AlF_6 + H_2O \rightarrow K_2AlF_5 \cdot H_2O + KF.$$

However, in practice these theoretical quantities of KF (if indeed actually present, in water) are too small to produce any noticeable increase in hygroscopicity or other undesirable properties of the flux; hence the term "essentially free of unreacted KF" properly embraces the situation of the present flux compositions in water, notwithstanding the theoretically possible appearance of free KF therein in quantities which are insignificant from the standpoint of this invention.

Methods of preparing fluxes in accordance with the invention include mixing and fusing $AlF_3$ and KF, as noted above; or mixing and fusing $KAlF_4$ and KF; or mixing previously prepared $K_3AlF_6$ and $KAlF_4$; or mixing previously prepared $K_3AlF_6$ and $AlF_3$. For many applications, and as a particular feature of the invention, the stated intimate mixtures of potassium fluoaluminate complexes (essentially free of unreacted KF) are provided in finely divided solid form, having a maximum particle size not larger than 1/16 inch and indeed very preferably not larger than 150 microns, or with special advantage even smaller. For example, the fused mixture of complexes produced by heating a mixture of $AlF_3$ and KF may be solidified by cooling and then ground to the appropriate particle size; or previously prepared $K_3AlF_6$ and $KAlF_4$ may be mixed in finely divided form, with further grinding as and if necessary to achieve particles of desired fineness.

As stated, the fluxing of aluminum (and/or alloys thereof) in accordance with this invention by placing, on or between aluminum or aluminum alloy surfaces, a flux comprising an intimate mixture of potassium fluoaluminate complexes essentially free of unreacted potassium fluorides, affords special advantages for aluminum brazing operations. The flux, in addition to being nonhygroscopic before brazing and leaving no substantially water-soluble residue after brazing, is essentially inert with respect to aluminum metal at brazing temperatures; acts to remove oxides including aluminum oxide; becomes reactive (e.g. at least partially molten) at brazing temperatures; and performs the other functions of fluxes mentioned above. It is convenient, and in many cases preferred, to use a flux having a composition about equal to the aforementioned eutectic $AlF_3$/KF proportions, since the melting point of flux compositions in the neighborhood of that eutectic is below the melting point (about 577°C) of commonly used aluminum brazing alloy. However, other flux compositions within the broader composition limits stated above are also suitable for brazing aluminum, indeed even if the liquidus point thereof is somewhat above the melting point of the brazing alloy, so long as the flux becomes reactive (partially molten) at temperatures below the melting point of the metal of the surfaces to be joined.

In this aspect, the invention contemplates applying an intimate mixture of potassium fluoaluminate complexes, essentially free of unreacted potassium fluoride, to or between aluminum surfaces prior to heating for brazing. In specific embodiments of the invention, the flux may be applied in finely divided solid form, e.g. in a vehicle which may (with special advantage in particular cases) be water carrying the divided flux as an aqueous slurry thereof. Brazing is accomplished by subsequent heating, with the surfaces to be joined and the brazing alloy appropriately juxtaposed or "fitted up," and with the flux applied to or interposed between all initially exposed metal surfaces (including brazing alloy surfaces) at or adjacent the joint, the heating being such as to melt the brazing alloy and render the flux reactive without reaching the melting point of the metal of the surfaces to be joined.

The invention further contemplates the combination, with such fluxing procedure, of the preliminary steps of preparing the flux, e.g. by one of the methods mentioned above.

In addition, the invention contemplates the provision of a fluxed aluminum or aluminum alloy article (e.g. brazing sheet) having an adherent surface coating of the above-defined flux (e.g. deposited on a brazing-alloy-clad surface, in the case of brazing sheet).

Further features and advantages of the invention will be apparent from the detailed description hereinbelow set forth.

DETAILED DESCRIPTION

By way of specific example, the invention will be described herein with reference to aluminum brazing operations.

In accordance with the invention, a flux is prepared comprising an intimate mixture of potassium fluoaluminate complexes essentially free of unreacted potassium fluoride and having a composition corresponding to an $AlF_3$KF ratio, in parts by weight, between about 65:35 and about 45:55 (preferably between about 60:40 and about 50:50). Indeed in a preferred form the flux consists essentially of an intimate mixture of $KAlF_4$ and $K_3AlF_6$; as a still further feature of preference, the composition of this mixture is about equal to the $AlF_3/KF$ eutectic. That is to say, the flux in accordance with the invention is in a form consisting essentially of such mixture of complexes, and is essentially free of unreacted KF, before it is applied to any brazing alloy or other metal surface.

The simplest and presently preferred method of obtaining such a mixture is to fuse together $AlF_3$ and KF in correct proportions, allow the mix to solidify by cooling and then grind the cooled mass to an appropriately small particle size, e.g. to allow it to be suspended in water in the form of a thin slurry. It is found that grinding to a maximum particle size of not more than about 150 microns is generally satisfactory, but it is preferred to grind it to a maximum particle size smaller than 104 microns or even smaller than 75 microns.

As an alternative, it is possible to mix previously separately prepared $K_3AlF_6$ and $KAlF_4$ (e.g. in particle form) in the required proportions, to produce the requisite intimate mixture, with further grinding if necessary, to achieve a desired small particle size. The preparation of $KAlF_4$ has been described by Brosset in Z. Anorg. Algem. Chemie, Vol. 239, pages 301–304 (1938). Still further alternative methods for preparing flux compositions embraced by the invention include mixing and fusing previously separately prepared $KAlF_4$ and KF in appropriate relative proportions, or mixing previously separately prepared $K_3AlF_6$ and $AlF_3$ in appropriate proportions.

More generally, in certain presently preferred embodiments of the invention, the aforementioned intimate mixture of potassium fluoaluminates (typically $KAlF_4$ and $K_3AlF_6$) in the stated proportions, essentially free of unreacted potassium fluoride and prepared e.g. as by one of the foregoing procedures, is provided in divided solid form and is applied as a flux to or between metal surfaces in such form, for example in a suitable carrier or vehicle in which the flux is at least substantially insoluble. In a broad sense, an upper limit of flux particle size is about 1/16 inch; particles above that limit would physically interfere with desired fitup of surfaces to be brazed or otherwise joined, would impede proper application of the flux, and would tend to fall or be dislodged from any nonhorizontal surface to which they were applied. Very preferably, the particles of flux are smaller and indeed all very much smaller than this broad upper limit, the preferred upper limits of particle size being those given above, i.e. 150 microns or even less. Again stated in general, the smaller the flux particles the better (at least within practically attainable size limits), for such reasons as ease of flux application, flowability of a flux-containing vehicle and adherence of the applied flux.

For various purposes, e.g. in certain aluminum brazing operations, the flux is conveniently or preferably applied as an aqueous slurry, i.e. with the finely divided flux particles carried in water as a vehicle. Water is advantageous as a vehicle because it readily and completely evaporates at brazing temperatures; and the present flux is suitable for use therewith, because it is substantially insoluble in water. The theoretical slight solubility of the fluoaluminate complex $K_3AlF_6$ in water does not lead to presence of unreacted KF in deleterious amounts.

Typically, when the flux of the invention is applied in a water vehicle, the flux material is made up into a thin slurry by the addition of e.g. 2 parts of water to 1 part by weight of finely ground flux. A very small amount of surface active agent is found to assist the deposition of a uniform layer of flux on the aluminum surface (which may be the aluminum brazing alloy surface or the surface of the aluminum to which the brazing alloy is to be joined), and it is sometimes convenient to add a very small amount, such as ½%, of a conventional hydroxyethyl cellulose thickening agent to help maintain the flux in suspension. The amount of carbonaceous material is too small to lead to the formation of unacceptable carbon deposits during the brazing operation.

It is preferred that the relative proportions of KF and $AlF_3$ employed in the preparation of the flux should be as close to the eutectic point as possible. While the melting point shown in the published diagram (Journal American Ceramic Society, 49, pages 631–34, December 1966) rises very rapidly if the quantity of KF rises above that required for the eutectic, there is only a slight rise in melting point to about 574°C where the $AlF_3$ rises above the eutectic up to a total of about 60% (50 mole % $AlF_3$).

As stated, in a preferred sense the flux of the present invention consists essentially of an intimate mixture of potassium fluoaluminate complexes as defined above in such amounts that the aluminum fluoride/potassium fluoride ratio, in parts by weight, is 65:35–45:55 and is essentially free of unreacted KF. For aluminum brazing operations, it is commonly preferred that the $AlF_3/KF$ ratio be such that the flux becomes reactive at not more than about 600°C. Preferably, the flux is an intimate mixture of $K_3AlF_6$ and $KAlF_4$ corresponding to an $AlF_3/KF$ ratio between about 60:40 and about 50:50, in parts by weight, essentially free of unreacted KF.

It is found that, surprisingly in relation to the above-quoted published data, satisfactory fluxing is effected throughout the quoted range, although the effectiveness of the flux decreases away from the eutectic point.

Small quantites of alkali- or alkaline-earth metal or zinc fluorides (i.e. other than KF), up to a total of about 5 mole %, can be tolerated, providing that the melting point of the flux is not raised excessively above that of the brazing alloy with which it is to be used. Specifically, it has been found that intimate mixtures of potassium fluoaluminate complexes essentially free of unreacted KF but containing minor amounts (i.e. not more than a total of about 5 mole %) of LiF, $CaF_2$, or NaF possess satisfactory properties for use as fluxes in accordance with the present invention; for example, a composition having an analysis of 40.2% KF, 56.4% $AlF_3$, 3.4% $CaF_2$(% by weight) had a liquidus temperature of 580°C, satisfactory for many fluxing purposes. However, the presence of such fluorides does not appear to confer any benefits by reducing the melting point below that of the $KF/AlF_3$ eutectic and all have the effect of raising the melting point to some extent even where the $KF/AlF_3$ proportions have been adjusted to provide optimum melting point conditions.

The fluxing of aluminum in accordance with the invention is performed by applying a flux composition as defined above to or between surfaces of aluminum, e.g. a surface of an aluminum brazing alloy, or a clad surface of brazing sheet, or a surface (of aluminum or an aluminum alloy) which is to be joined to another by brazing; the flux may be in finely divided solid form, for example, and may be dispersed in water or other suitable inert vehicle which is substantially completely removable (by evaporation or otherwise) at brazing temperatures. The specific flux composition employed should be selected so as to be reactive (typically at least partially molten) at the brazing temperatures used.

Ordinarily, it is preferred that the flux have a liquidus point lower than the melting point of the brazing alloy employed; however, satisfactory fluxing is achieved even if the liquidus point of the flux somewhat exceeds the brazing alloy melting point, so long as brazing is performed at a temperature sufficiently high to render the flux reactive. Also, for brazing, the temperature at which flux becomes reactive should be lower than the melting point of the metal (i.e. other than brazing alloy) of the surfaces to be joined.

The flux is applied, prior to brazing, so as to come into contact with all exposed metal surfaces at the locality of the joint to be produced, during the brazing operation. If, for example, the flux is applied in finely divided solid form in an aqueous slurry and the water of the slurry is evaporated prior to brazing, the flux will adhere as a powderlike coating to the fluxed aluminum or alloy surface. In any event, the flux (as applied, prior to brazing) is already a mixture of potassium fluoaluminate complexes essentially free of unreacted KF. After the flux is applied and the components to be brazed are fitted up in appropriately juxtaposed relation with the brazing alloy adjacent to or between the component surfaces to be joined, the flux being disposed for contact (during brazing) with exposed metal surfaces at the locality of the joint, brazing is effected by heating to a temperature at which the brazing alloy melts and the flux becomes reactive (e.g. molten) but at which the metal of the components to be joined does not melt. Upon such heating, the flux acts to remove metal oxides, including aluminum oxide, present on exposed metal surfaces and promotes flow of the brazing alloy, thereby enabling production of a satisfactory brazed joint. The flux residue remaining after brazing is substantially insoluble in water; hence corrosion problems, as heretofore associated with conventional chloride fluxes, do not arise.

In preparing the flux by the fusion method from technical grade KF and $AlF_3$ the materials in finely ground, preferably dry state are mixed in proportions to yield KF and $AlF_3$ within the above relative proportions. The purity of the KF is not critical and technical or commercial grade KF has been found to be satisfactory. The impurities normally associated with technical KF are therefore acceptable and, to facilitate weighing and mixing with the $AlF_3$, the KF is preferably ground to at least a maximum particle size smaller than 150 microns and should preferably be moisture-free to avoid difficulties in the fusion operation.

In the case of the aluminum fluroide, the effectiveness of the flux appears to diminish with decreasing purity of this component. The best technical results are obtained with pure distilled $AlF_3$. On the other hand, a usable flux has been prepared from aluminum fluoride with an $AlF_3$ content as low as 67%. The purity of commercially available aluminum fluoride depends largely on the method of manufacture and the preferred commercial material is 95% purity aluminum fluoride which is produced by the fluosilicic acid process and is available at reasonable cost. The principal impurity in this material is alumina while the other normally-associated impurities such as sulfates, iron oxide, silica, etc. are believed to have little effect but should each be less than 0.3%. Aluminum fluorides of lower purity and produced by alternative processes have been used successfully, but to ensure consistent success, that is, over a reasonably wide range of furnace brazing conditions, the minimum purity should be 90% $AlF_3$.

As stated above, both KF and $AlF_3$ should preferably be dry before the fusion reaction, both to facilitate the provision of proper relative proportions of the two fluorides, and also to avoid the possibility of the hydrolysis of $AlF_3$.

EXAMPLE

Potassium fluoride and aluminum fluoride in a thoroughly dried condition are ground to a maximum particle size smaller than 212 microns. The ground materials are mixed in the proper proportions and mixed intimately. The mixture is then placed in a graphite crucible, which is placed in a furnace at 625°–650°C. As the mixture fuses it it stirred with a platinum stirrer. The molten material is then quickly poured into a mold to solidify.

Flux material made as described above was ground to a maximum particle size finer than 75 microns and was slurried with water to form a thin slurry as described above and the material was employed in the production of a heat exchanger of the wafer and fin type, produced from brazing alloy-coated brazing sheet of the type already discussed. The aqueous slurry was applied to the facing surfaces of the assembly at a rate of about 250 gms/sq. meter. With this flux application sound joints were formed when the assembly was subjected to a temperature of about 600°C in the brazing furnace.

Unlike the conventional chloride fluxes, the fused aluminum fluoride/potassium fluoride complex flux is nonhygroscopic. This allows the flux material to be exposed to the atmosphere or to be formed into an aqueous slurry prior to brazing without the problems of oxychloride formation, and permits strong dense corrosion-free joints to be formed.

While an essentially important advantage of the present invention is that it provides a flux of extremely low solubility, which may be applied as an aqueous slurry and which results in an essentially inactive residue, the flux performs its fluxing function equally well when applied in a resinous vehicle, provided that the brazing operation can be carried out under conditions permitting the resinous binder to be burnt away.

Since the material is essentially noncorrosive to aluminum and nonhygroscopic, the use of a flux of this nature opens up the possibility of supplying prefluxed brazing sheet, which would be of great value in high volume production of some brazed assemblies.

The resinous vehicle should be of such a nature that it decomposes below the melting point of the flux. However, many resins have this characteristic.

The flux, ground to a size of −100 mesh (smaller than 150 microns) or finer, may be dispersed in a water-soluble or a water-dispersible resin, an example of the latter being Reichold polyester resin STF 355 in combination with a suitable cross-linking agent such as Cymel 300. The flux composition is then spread on the surface of the brazing sheet and thermally cured at an appropriate temperature to bake the resin to put it into a condition suitable for storage until the brazing operation is to be carried out. Of course the flux-resin mixture may be applied just prior to brazing, in which case the thermal curing operation can be omitted. Alternatively, a solvent-based resin composition may be employed, such as a solvent-based acrylic resin paint vehicle. A further alternative is to apply both the flux and the resin as dry powders by electrostatic methods with subsequent thermal curing. The flux should be applied preferably in an amount of 175–350 gms./sq. meter to obtain good results. It is, of course, clear that the flux is only required on or adjacent to those areas of the sheet which will coincide with a joint. In some instances therefore it is sufficient to apply the flux paint composition to selected areas, for example by the employment of a screen printing technique, to achieve economy in materials.

In another use the flux is mixed with a powdered aluminum alloy of a type used as a brazing alloy, and with a resinous vehicle. This mixture is spread on components made from aluminum sheet, tube, or other wrought products or from castings, whose surface, unlike that of the brazing sheet described above, has not been clad with a brazing alloy layer. These coated components may be heated so as to produce on their surface a hard nonhygroscopic layer containing flux, resin and the powdered brazing alloy. Such components can subsequently be joined together by simultaneously holding them in contact and heating them to, or slightly above, the melting point of the brazing alloy. In the presence of the flux the molten particles of the brazing alloy coalesce and form an alloy bond with and between the components. In yet another use, the flux-resin coating is spread on both sides of a rolled strip of a brazing alloy which is then thermally cured so as to yield brazing stock which may be cut to the required size and inserted between or adjacent to components of uncoated wrought or cast aluminum which are to be brazed together.

When employing conventional water-soluble chloride fluxes, which must be removed after the brazing operation, it has been the practice to quench brazed assemblies in water immediately after removal from the brazing furnace. Where a high strength was required, it was usual to employ a brazing sheet having a core of an alloy whose maximum strength can be developed only by quenching from elevated temperature and by subsequently age-hardening, e.g. AA6951 (Al—Si 0.3%, Cu 0.25%, Mg 0.6%).

According to a further feature of the invention, there may be employed, as the core alloy for a brazing sheet for use in conjunction with the flux of the present invention, an aluminum alloy which can develop satisfactorily high strength properties when cooled relatively slowly, such as by cooling in air, on removal from the brazing furnace, and is self-aging, so that an aging heat treatment step after quenching becomes unnecessary. Thus a self-aging Al—Zn—Mg alloy, such as AA7104 (Al—Zn 3.8%, Mg 0.8%) may be employed as core alloy, having a melting range of 615°–645°C. This alloy is preferably modified by the inclusion of a grain-growth inhibitor, such as 0.3% Mn. The core alloy is preferably clad with an Al—Si 10% or Al—Si 12% alloy, modified by the addition of 1–2% Zn to reduce the difference in the electropotential between the core alloy and the cladding alloy to a value of less than about 0.1 volt when measured with reference to a saturated calomel electrode in a solution of normal sodium chloride plus 0.1N hydrogen peroxide. The inclusion of the stated amount of zinc has little effect on the melting point of the brazing alloy Al—Si cladding layer.

Stated in general, there are a variety of mixtures of KF and/or $AlF_3$ and/or potassium fluoaluminate complexes that may be used as starting materials for fluxes in accordance with the present invention, one further example (in addition to those mentioned above) being a mixture of previously separately prepared $K_3AlF_6$ and $AlF_3$. As long as the starting materials are in proper proportions (expressed as $AlF_3/KF$ ratio), a flux composition in accordance with the invention can be produced from their mixture. If one of the starting materials is free or unreacted KF, fusion of the mixture (i.e. to achieve essentially complete elimination of the hygroscopic unreacted KF) is necessary; but if free KF is not among the starting materials, fusion of the mixture is not necessary.

It is to be understood that the invention is not limited to the features and embodiments hereinabove set forth, but may be carried out in other ways without departure from its spirit.

We claim:

1. A method of joining by brazing surfaces of metal selected from the class consisting of aluminum and alloys thereof with an aluminum brazing alloy having a melting point lower than that of metal of the surfaces to be joined, comprising:
    a. disposing, for contact, between the surfaces, with exposed metal including a body of the brazing alloy which is to serve for joining the surfaces, a flux comprising a mixture of potassium fluoaluminate complexes and essentially free of unreacted potassium fluoride;
    b. heating the brazing alloy body and flux, in juxtaposed relation to the surfaces to be joined, to a temperature above the brazing alloy melting point for joining the surfaces; and
    c. then allowing said body and said surfaces to cool.

2. A method according to claim 1, wherein the flux-providing step comprises providing a flux consisting essentially of a mixture of said potassium fluoaluminate complexes essentially free of unreacted potassium fluoride and having a composition corresponding to an aluminum fluoride/potassium fluoride ratio, in parts by weight, between about 65:35 and about 45:55.

3. A method according to claim 1, wherein the flux-providing step comprises providing a flux as aforesaid wherein said ratio is between about 60:40 and about 50:50.

4. A method according to claim 3, wherein the disposing step comprises disposing a flux as aforesaid consisting essentially of a mixture of $KAlF_4$ and $K_3AlF_6$.

5. A method according to claim 2, wherein the flux-providing step comprises providing a flux as aforesaid in finely divided solid form.

6. A method according to claim 5, wherein the flux-providing step comprises providing a flux as aforesaid in finely divided solid form having a maximum particle size of not more than about 1/16 inch.

7. A method according to claim 6, wherein said maximum particle size is not more than about 150 microns.

8. A method according to claim 6, wherein the flux-providing step comprises providing the flux in dispersion in a vehicle in which the flux is substantially insoluble.

9. A method according to claim 2, further including the steps of preparing the flux by
    a. establishing a dry mixture of divided solid aluminum fluoride and potassium fluoride in proportions providing said ratio, and
    b. heating the last-mentioned mixture for effecting substantially complete fusion thereof.

10. A method according to claim 2, further including the step of preparing the flux by combining separately prepared $K_3AlF_6$ and $KAlF_4$ to provide a mixture thereof, essentially free of unreacted potassium fluoride, and having a composition corresponding to said ratio.

11. A method according to claim 1, wherein said flux has a composition corresponding to a substantially eutectic mixture of aluminum fluoride and potassium fluoride.

12. A method according to claim 1, wherein said mixture of potassium fluoaluminate complexes consists essentially of a mixture of at least two compounds selected from the class consisting of $AlF_3$, $K_3AlF_6$, and $KAlF_4$.

13. A method according to claim 1, wherein said mixture of potassium fluoaluminate complexes consists essentially of $KAlF_4$.

14. A method of joining by brazing surfaces of metal selected from the class consisting of aluminum and alloys thereof with an aluminum brazing alloy having a melting point lower than that of metal of the surfaces to be joined, said method comprising the steps of
 a. disposing, for contact, between the surfaces, with exposed metal including a body of the brazing alloy which is to serve for joining the surfaces, a layer of a flux in finely divided solid form dispersed in water as a slurry, said flux consisting essentially of a mixture of potassium fluoaluminate complexes essentially free of unreacted potassium fluoride;
 b. heating the brazing alloy and flux layer, in juxtaposed relation to the surfaces to be joined, to a temperature above the brazing alloy melting point for joining the surfaces; and
 c. then allowing the brazing alloy and the surfaces to cool.

15. A method according to claim 14, wherein the flux-providing step comprises providing a layer of a flux as aforesaid having a composition corresponding to an aluminum fluoride/potassium fluoride ratio, in parts by weight, between about 60:40 and about 50:50.

16. A method according to claim 15, wherein said body of brazing alloy is formed as a cladding on the other of the surfaces to be joined, and wherein the flux-providing step comprises disposing the slurry in proximate relation to said one surface and said cladding.

* * * * *

UNITED STATES PATENT OFFICE
CERTIFICATE OF CORRECTION

Patent No. 3,951,328      Dated April 20, 1976

Inventor(s)    Eric Robert Wallace et al.

It is certified that error appears in the above-identified patent and that said Letters Patent are hereby corrected as shown below:

Page 1, col. 1, after item [63] and before item [52], insert
--[30]    Foreign Application Priority Data
        Aug. 2, 1972 United Kingdom. . . .36183/72-- .

Col. 9, line 51, "fluroide" should read --fluoride-- .

Col. 10, line 37, "essentially" should read --especially-- .

Col. 12, line 39 (claim 3), "A method according to claim 1" should read --A method according to claim 2-- .

Col. 14, line 5, before "flux", "ahd" should read --and-- .

Signed and Sealed this

Twenty-second Day of February 1977

[SEAL]

Attest:

RUTH C. MASON
Attesting Officer

C. MARSHALL DANN
Commissioner of Patents and Trademarks